April 12, 1938.    H. E. HEIGIS    2,114,264
VALVE STRUCTURE
Original Filed Dec. 7, 1934
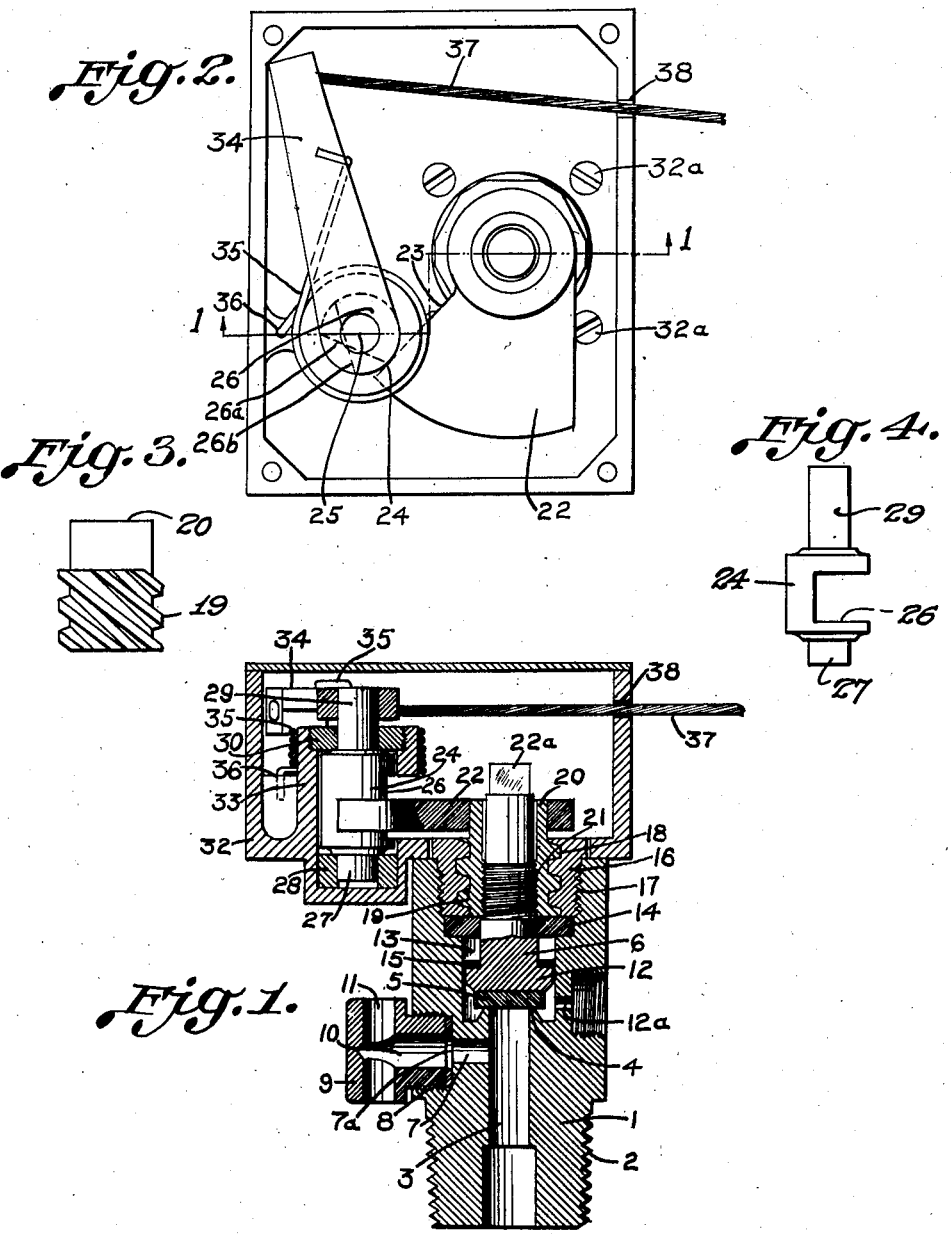
INVENTOR
HENRY ERNEST HEIGIS
BY Paul G. Anderson
ATTORNEY Patented Apr. 12, 1938

2,114,264

UNITED STATES PATENT OFFICE 2,114,264

VALVE STRUCTURE

Henry Ernest Heigis, West Orange, N. J., assignor to Walter Kidde & Company, Inc., Bloomfield, N. J., a corporation of New York Application December 7, 1934, Serial No. 756,414
Renewed October 18, 1937

16 Claims. (Cl. 251—26)

The present invention relates broadly to a valve structure.

One of the objects of the invention is to provide a valve structure which is particularly adapted for use with high pressure apparatus.

Another object of the invention is to provide a valve construction which is particularly adapted for use with containers of liquefied gases, such as carbon dioxide, which are employed in extinguishing fires.

An additional object of this invention is the provision of a valve construction of the above general type with parts arranged in such a manner that the valve may be moved from a closed position to a fully opened position almost instantaneously.

A further object of the invention is the provision of a valve so constructed that the action of the high pressure medium, which it is holding in check, will serve to open the valve.

A further object of the invention involves a valve construction which permits a manual opening of the valve in order to allow filling of the container with which it is employed.

Another object of the invention is to provide a valve construction of the above general type with parts so arranged that the valve is normally held in a closed position to prevent the valve from accidentally opening but at the same time it is adapted to open easily.

Figure 1 illustrates, in cross-section, an elevational view of an embodiment of the invention, and Figure 2 is a top view of the valve of Figure 1.

Figure 3 is an external view of one of the elements of the invention, and

Figure 4 is an external view of another of the elements of the invention.

The present invention is concerned with a valve which may be employed on high pressure containers, such as a carbon dioxide container, which must be sealed tightly and at the same time must be readily adapted to open rapidly to permit the discharge of the contents of the container. Previously, various methods have been employed to achieve this purpose which have not been satisfactory.

Referring to Figure 1 it will be seen that the valve body 1 is provided with threads 2 with which it may engage a container of a high pressure medium (which is not illustrated). A passage 3 through the valve body leads from such container and it is through this passage that the pressure medium may be led into, or permitted to escape from, the container. At the upper end of the passage, a seat 4 is formed. A valve plug 5 of a fiber material is adapted for contacting this seat. The valve plug 5 is mounted on a valve stem 6. Below the seat 4 and leading off from the passage 3, another passage 7 is provided. A safety disc 7a designed to burst at a predetermined pressure seals the contents of the container therein. If the pressure in the container should reach the predetermined pressure the disc will burst and permit the contents to escape. The passage 7 has an enlarged portion which is threaded at 8 and into which is fitted a recoil adapter 9 having passages 10 and 11 through which a high pressure medium may discharge without any obnoxious recoil being exerted on the handle. Such a device is well known in the art and is more particularly described in the United States Reissue Patent 18,839.

Above the seat is a passage 12a through which the gas is discharged. This passage is provided with threads by which discharge piping may be attached so that the medium may be conveyed to the area where it is desired to have the gas escape into the atmosphere.

The stem 6 has an enlarged head 12 which is in a chamber 13 of the body 1. It is in this head that the valve plug which engages the valve seat is secured. At one end of the chamber is fixed a stop 14 against which the washer 15 mounted on the head rests when the valve is in its fully open position. The stop 14 is held in position by the plug 16 which is in threaded engagement with the valve body at 17. On the inner surface of the plug 16 are provided fast lead threads 18 which are adapted to engage fast lead threads 19 on the bushing 20. By way of example, these threads may be quadruple threads having a lead equal to four times the thread pitch. The inner surface of the bushing 20 has on it slow lead threads 21 which engage corresponding male threads on the valve stem 6. At the upper end of the stem 6, a flat portion 22a is provided by which the valve stem may be rotated manually.

Figure 3 is an external view of the bushing 20.

It will thus be seen that the valve may be opened by raising it from the seat 4 by either one of two methods. It may be raised rapidly by employing the fast lead threads 19, or more slowly by using the slow lead threads 21. The pressure of the medium constrained will assist the opening of the valve when the fast lead threads are employed since it will tend to push the valve up. Of course, the slow lead threads on the stem will remain in a fixed position with regard to the corresponding threads on the bushing 20 unless the stem is rotated manually. Such threads will remain in the position in which they are placed. This, however, is not true of the fast lead threads 19 which will rotate when pressure is placed on the valve and raise it from the seat. Accordingly, a locking means must be provided to prevent the raising of the valve when it is desired to maintain the valve closed.

The locking means consist of a cam 22 attached to the upper end of the bushing 20. A surface 23, on the cam 22, is provided to engage the upright spindle 24 on its rounded surface 25. These parts are so designed that the stem cannot move up from the valve seat on the fast lead threads until the spindle 24 has been rotated so that the cutout portion 26 will permit the cam 22 to rotate and move past the spindle and thereby permit the opening of the valve by the pressure of the confined medium. It should be noted that the cutout portion 26 of the spindle 24 extends inwardly from the outer surface of the spindle past the longitudinal axis of the spindle, leaving the cross-section of the spindle at the cutout portion of lesser cross-section than the cutout portion itself. In Figure 2 the line 26a shows the cutout portion 26 in the normal locking position and the line 26b shows the cutout portion in the position which permits the cam 22 to rotate. These parts are enclosed in a lever box 32 which may be attached to the body by appropriate means such as the screws 32a.

Figure 4 is an external view of the spindle 24.

The spindle 24 has an extension 27 which rides in a thrust bearing 28. At the other end of the spindle is an extension 29 which is held in position by the ring bearing 30. This bearing has threads 31 by which it is attached to the lever box 32 on the projection 33.

At the outer end of the extension 29 is fastened a lever 34 which is normally held by a spring 35 in such a position that the spindle surface 24 is in contact with the cam surface 23. The spring 35 is secured on the lever and is held in the lever box by inserting a portion thereof into a hole 36 in the lever box 32. At the outer end of the lever 34 is fastened a cable 37. The cable is run from the end of the lever through a hole 38 in the lever box 32 to the exterior thereof. By this means the lever may be pulled so that the cam 22 may pass through the cutout portion 26 of the spindle 24 and the valve plug 5 will be raised from the seat 4.

After the valve body has been attached to a container for a medium under pressure the lever 34 and fast lead thread bushing 20 are set in their normally closed position. The stem 6 may then be rotated by a wrench and raised from the seat 4 of the valve body 1. The container is then charged through the passages 12a and 3. When the desired amount of the medium has been placed in the container it is only necessary to turn the stem down until the plug 5 rests firmly on the seat 4 and securely seals the medium in the container. When it is desired to release the medium it is only necessary to pull the lever 34 against the action of the spring 35.

Movement of the lever 34 will free the cam 22. The action of the pressure of the medium on the plug 5 will be transmitted to the bushing 20 which will tend to rotate with respect to the plug 16 since it engages the plug with fast lead threads. One of the characteristics of such threads is that they permit easy rotation when pressure is applied and they do not tend to lock the parts in place.

From the foregoing disclosure it will be apparent that this invention resides in certain principles of construction which may be employed in other physical forms of apparatus without departure therefrom. It is apparent, therefore, that the form of apparatus illustrated in the drawing for the purpose of disclosure has been given solely in an illustrative sense and not in any limiting sense. The scope of this invention is best defined by the appended claims.

I claim:

1. A quick acting valve adapted for use with a medium under pressure comprising a valve body having a passage therethrough, means rotatably mounted on fast lead threads to close said passage and adapted to rapidly open said passage by the pressure of said medium, manually operable rotatably mounted means associated with said first named means adapted to slowly open said passage, and means to normally prevent rapid opening of said passage.

2. A quick acting valve adapted for use with a medium under pressure comprising a valve body having a passage therethrough, means to close said passage, a fast lead thread associated with said body and said means to permit rapid opening of said passage by the pressure of said medium, a slow lead thread associated with said body and said means to permit slow opening of said passage, and means to normally prevent rapid opening of said passage.

3. A quick acting valve adapted for use with a medium under pressure, comprising a valve body, a passage in said body, a seat in said passage, a valve disc to engage said seat, a stem on said valve disc, a bushing in said passage, slow lead threads on said stem to engage said bushing to raise the disc from the seat slowly, fast lead threads on said bushing to engage said body and adapted to raise the disc from the seat rapidly by the pressure of said medium, a rotating lever on said bushing, and a locking lever to normally prevent rotation of said rotating lever and normally maintain said disc on said seat.

4. A quick acting valve adapted for use with a medium under pressure, comprising a body, a passage through said body, a seat in said passage, a valve disc to engage said seat, a stem on said valve disc, and a bushing in said body engaging the wall thereof with fast lead threads, said stem engaging said bushing with slow lead threads.

5. A quick acting valve adapted for use with a medium under pressure, comprising a body, a passage through said body, a seat in said passage, a valve disc to engage said seat, a stem on said valve disc, a bushing in said body engaging the wall thereof with fast lead threads, said stem engaging said bushing with slow lead threads, a rotating lever associated with said bushing, and a locking lever mounted on said body said locking lever normally preventing rotation of said rotating lever.

6. A quick acting valve adapted for use with a medium under pressure comprising a body formed with a seat, a valve disc to engage said seat, a normally locked lever controlling actuation of said valve disc, means to move said disc relatively rapidly with respect to said body and said seat to quickly open and close the valve, said means comprising means to move said valve disc relatively slowly with respect to said seat to slowly open and close the valve, and means to release said lever to permit the valve to open quickly, said lever when released permitting the valve disc to move away from the seat under the pressure of the medium.

7. A quick acting valve adapted for use with a medium under pressure comprising a body, a passage through said body, a seat in said passage, a valve member to engage said seat, means threadedly mounted in the body to move the valve member rapidly with respect to said body and said seat, said means comprising means to move the valve member slowly with respect to said first named means and said seat.

8. A quick acting valve adapted for a medium under pressure, comprising a body, a passage in said body, a seat in said passage, a valve disc to normally engage said seat, a stem on said disc, a bushing in said body, slow lead threads on said stem to engage said bushing, fast lead threads on said bushing to engage said body, a cam attached to said bushing, a locking lever to normally prevent movement of said cam, and means to move said locking lever to release said cam to allow said medium under pressure to rotate said disc and open said passage.

9. In a valve comprising a body, a passage in said body, means to close said passage, means associated with said first named means to effect rapid opening of said passage by fluid pressure, means normally restraining said second named means, and rotatably mounted means associated with said first and second named means to effect relatively slow opening of said passage, said last named means being manually operable and incapable of opening under the pressure of a fluid.

10. A quick acting valve for use with a medium under pressure comprising a body, a passage in said body, a bushing rotatably mounted in said body and adapted for a relatively large longitudinal movement with respect to the body upon a relatively slight degree of rotation, a valve disc connected to and movable with said bushing and normally closing said passage, said connection comprising rotatable means to longitudinally move said disc a relatively small amount with respect to said bushing upon a relatively slight degree of rotation.

11. A quick acting valve for use with a medium under pressure comprising a body, a passage in said body, a bushing rotatably mounted in said body and adapted for a relatively large longitudinal movement with respect to the body upon a relatively slight degree of rotation, a valve disc connected to and movable with said bushing and normally closing said passage, said connection comprising rotatable means to longitudinally move said disc a relatively small amount with respect to said bushing upon a relatively slight degree of rotation, and means to normally prevent rotation of said bushing.

12. A quick acting valve adapted for use with a medium under pressure comprising a valve body, a passage in said body, a seat in said passage, a valve disc to engage said seat, and rotatable means associated with said valve body and said valve disc and normally held against movement and adapted to permit the pressure of the medium to raise said disc by rotating said means upon release thereof, said last named means including rotatable means to permit raising of said disc manually.

13. A quick acting valve adapted for use with a medium under pressure, comprising a body having a passage therethrough, a bushing in said body, means on said bushing rotatably engaging said body and adapted to permit relatively rapid longitudinal movement of said bushing with respect thereto, a valve stem in said passage, means on said stem engaging said bushing, said means permitting relatively slow longitudinal movement of said stem with respect to said bushing, means to normally prevent movement of said bushing, and releasing means to permit movement thereof.

14. A quick acting valve for use with a medium under pressure, comprising a valve body, a passage therethrough, a seat in said body, a disc adapted to engage said seat, a stem associated with said disc, a chamber in said body, a plug in said chamber, a bushing in said plug, said bushing engaging said plug with fast lead threads, said stem engaging said bushing with slow lead threads, a cam on said bushing, a spindle to lock said cam in a position to prevent movement of said bushing, a lever on said spindle, and a spring on said lever to normally hold said lever in a position to maintain said cam in its locked position.

15. A quick acting valve adapted for use with a medium under pressure comprising a valve body having a passage therethrough, means rotatably mounted on fast lead threads to close said passage and adapted to rapidly open said passage, and manually operable rotatably mounted means constituting a part of said first named means adapted to slowly open said passage.

16. A quick acting valve adapted for use with a medium under pressure comprising a valve body having a passage therethrough, means to close said passage, a fast lead thread associated with said body and said means to permit rapid opening of said passage, and a slow lead thread associated with said body and said means to permit slow opening of said passage.

HENRY E. HEIGIS.